United States Patent
Gribsvad

[11] 3,982,585
[45] Sept. 28, 1976

[54] HEAT EXCHANGE APPARATUS

[75] Inventor: Jørgen Gribsvad, Espergaerde, Denmark

[73] Assignee: Haldor Topsoe A/S, Soborg, Denmark

[22] Filed: Dec. 2, 1974

[21] Appl. No.: 528,972

[30] Foreign Application Priority Data
Nov. 19, 1974 United Kingdom............ 56843/73

[52] U.S. Cl.................................. 165/83; 165/158
[51] Int. Cl.² ...................... F28F 5/00; F28F 9/12
[58] Field of Search......... 165/81, 158 LT, 158 MF, 165/82, 83

[56] References Cited
UNITED STATES PATENTS

| | | | |
|---|---|---|---|
| 2,549,093 | 4/1951 | Huber | 165/81 X |
| 3,183,967 | 5/1965 | Mettenleiter et al. | 165/83 |
| 3,814,178 | 6/1974 | Parussel | 165/158 |
| 3,827,484 | 8/1974 | Wolowodiuk | 165/158 |

Primary Examiner—Charles J. Myhre
Assistant Examiner—Theophil W. Streule, Jr.
Attorney, Agent, or Firm—Lawrence Rosen; E. Janet Berry

[57] ABSTRACT

An apparatus for heat exchange between two fluid streams comprising a pressure shell, tube sheets, and a bundle of exchange tubes. At least one of the tube sheets is connected to the pressure shell by a flexible joint capable of absorbing thermal expansions and of carrying the load of the tube bundle, the flexible joint comprising a substantially cylindrical skirt element and an annular sheet connected with simple joints and connected to the tube sheet and the pressure shell, respectively.

2 Claims, 4 Drawing Figures

HEAT EXCHANGE APPARATUS

This invention relates to an apparatus for indirect exchange of heat between two fluids, more particularly between a hot gas stream and a cooling liquid.

The type of heat exchange apparatus to which this invention relates comprises at least a pressure shell, an inlet tube sheet, an outlet tube sheet, and exchange tubes arranged in a bundle between the inlet and outlet tube sheets. In a typical application of such a heat exchange apparatus, a hot gas stream is passed through the exchange tubes, while a cooling liquid, normally in a vaporizing state, is circulated around the exchange tubes.

The heat exchange apparatus according to the invention can be used for several purposes. For example, it can be used as a waste heat boiler, as a fired steam generating boiler, and as a tubular reactor for exothermic processes taking place in the presence of a catalyst contained in the tubes. The use of waste heat boilers is very important for the chemical process industry, where an efficient utilization of the heat of product gas streams is essential for the over-all economy of a chemical process plant. Therefore, a reliable and safe design of a heat exchange apparatus for such purpose is vital.

There is a serious problem common to all cases where a heat exchange apparatus of the type herein described is used: the differences between the thermal expansions of the exchange tubes, different parts of the tube sheets, and the shell will create severe mechanical stresses which may result in deformation or even rupture of certain parts of the apparatus. Several means are available for reducing the thermal stresses or rather the temperature differences which create the thermal stresses. Among these are increase of the rate of circulating the cooling liquid, thermal insulation of all faces exposed to the hottest gas streams, protection of critical parts by stainless steel tubes known as ferrules, etc.

However, for economic reasons it is desirable to increase the operating temperature and pressure of a heat exchange apparatus since this will improve the heat exchange efficiency. This particularly holds true for applications in the chemical process industry. Consequently, the above mentioned means are not always sufficient to eliminate damaging thermal stresses, and failures due to deformation or rupture of certain critical parts will, therefore, often occur with subsequent costly maintenance and repair of the heat exchange apparatus.

It has been proposed in U.S. Pat. No. 3,398,787 to overcome the problems of axial expansion of the exchange tubes by connecting one of the tube sheets to a tubular skirt which is slidably disposed within the bore of the pressure shell. A flexible and gas tight joint between this shirt and the pressure shell is obtained by a bellow. In this arrangement the bellow is too weak to carry the load of the bundle of exchange tubes. Therefore, in addition to the skirt sliding within the shell bore there is a guiding ring for additional support of the tube bundle.

It is now an object of the present invention to provide an improved design of a heat exchange apparatus in which the risk of damaging mechanical stresses resulting from differences in thermal expansions has been reduced or eliminated by a flexible joint capable of absorbing all expansions and of carrying the load of the bundle of exchange tubes.

Accordingly, there is provided an apparatus for indirect exchange of heat between two fluid streams comprising a pressure shell, an inlet tube sheet, an outlet tube sheet, and exchange tubes arranged in a bundle between the inlet tube sheet and the outlet tube sheet, in which at least one of the tube sheets is connected to the pressure shell by flexible joints capable of absorbing thermal radial expansions of the inlet tube sheet and thermal axial expansions of the exchange tubes without creating excessive mechanical stresses, and further capable of carrying the load of the tube bundle. The flexible joints between the tube sheet and the pressure shell comprises an annular sheet connected to the inner surface of the pressure shell by a single joint and a substantially cylindrical skirt element connected, by simple joints, at one end of the inner edge of the annular sheet and at the other end to the outer edge of the tube sheet, the diameter of which is smaller than the bore of the pressure shell.

In order that the invention should be better understood it will now be described, by way of an example, with reference to the accompanying drawings, in which.

Figure 1:
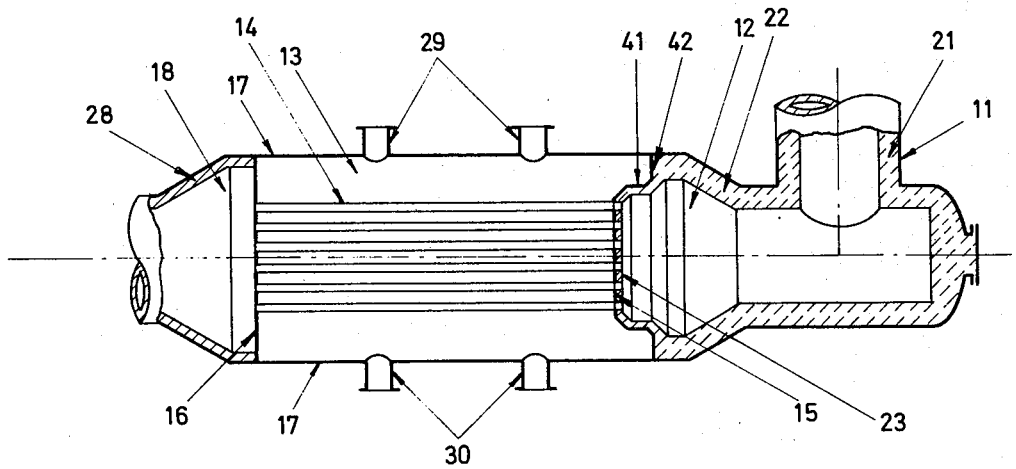
FIG. 1 is a vertical section through a heat exchange apparatus.

The embodiment of the invention shown in the accompanying drawings and described in the following is particularly suitable for use as a waste heat boiler in a chemical process plant. However, in principle the same embodiment can be used for other applications without requiring modifications of any significance.

A typical application of the heat exchange apparatus is in an ammonia plant in which the ammonia synthesis gas is prepared by steam reforming of hydrocarbons. In such a plant the hot product gas from the secondary reformer section is cooled in a waste heat boiler in which steam for the tubular reformer and/or for other purposes is generated. Normally the hot product gas leaves the secondary reformer through a refractory lined transfer line 11 directly connected to the inlet channel 12 of the waste heat boiler 13. From the inlet channel 12 the hot gas stream passes through the exchange tubes 14 extending from the inlet tube sheet 15 to the outlet tube sheet 16. The exchange tubes 14 are surrounded by water circulating in the pressure shell 17. The cooled gas is collected in the outlet channel 18 from where it may either be passed directly to further processing or first be subjected to further cooling in a secondary waste heat boiler (not shown in FIG. 1) operated in series with the waste heat boiler 13, which in such a case serves as a primary waste heat boiler.

Since the product gas entering the inlet channel 12 has a very high temperature, typically above 800°C and often even above 950°C, all parts in contact with the hot gas must be protected by thermal insulation or otherwise. Therefore, the transfer line 11 has a refractory lining 21. Similarly, the inlet channel 12 and the inlet tube sheet 15 are provided with insulating linings 22 and 23, respectively.

Figure 2:
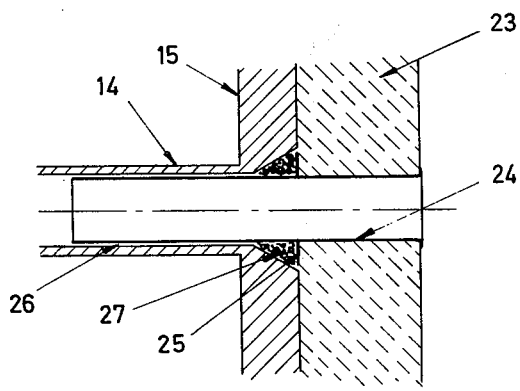
FIG. 2 is a detail of the joint between an exchange tube and a tube sheet.

All parts adjacent to the joints between the inlet tube sheet 15 and the exchange tubes 14 are subjected to very severe conditions, since at these positions the hot gas stream at its maximum temperature will be in contact with the inner surface of the exchange tubes. It will, therefore, normally be necessary to protect these parts by tube inserts of heat resistant steel known as ferrules 24 as shown in detail in FIG. 2. The ferrules 24 may be provided with anchor rings 25 and are arranged in such a way that there is a narrow spacing 26 between the ferrules 24 and the inner faces of the exchange tubes 14. In order to provide insulation the ferrules 24 are packed with a soft refractory material 27.

The conditions at the outlet channel 18 are less critical, since at this position the gas stream has been cooled to moderate temperatures. In some cases, however, the gas temperature is still high enough to require a thermal insulation of all inner faces of the outlet channel. A refractory lining 28 as is indicated in FIG. 1 may, therefore, be required also at this position.

In order to increase the heat transfer rate in the waste heat boiler the water will normally be circulated through the shell 17 and around the exchange tubes 14. This could either be by natural circulation or by forced circulation by means of a pump. In both cases a steam-water mixture will leave the waste heat boiler 13 through one or more top nozzles 29 at the top of the shell 17, while recycle water together with boiler feed water is introduced into the waste heat boiler 13 through one or more bottom nozzles 30 at the bottom of the shell 17. The steam-water mixture leaving through the top nozzles 29 is subsequently passed to a drum for separation of steam from liquid water which thereafter is recycled to the waste heat boiler 13, possibly through a pump. These auxiliaries for separating steam and recycling water are conventional and do not form parts of the invention. Therefore, they are not shown in FIG. 1.

In a conventional design of a heat exchange apparatus the inlet tube sheet and the outlet tube sheet are connected to the pressure shell by simple fixed joints. However, when operated at severe conditions certain parts of the heat exchange apparatus will be subjected to thermal expansions, because there are slight differences in temperature between various parts of the heat exchange apparatus. Furthermore, there may be differences in thermal expansion coefficients of materials used for the manufacture of various parts of the apparatus. For these reasons mechanical stresses will occur at critical positions. Even small temperature differences, for example in the range from 10° to 20°C, may result in critical mechanical stresses. Also the high pressure under which the heat exchange apparatus is operated will contribute to the formation of mechanical stresses.

Particularly, the inlet tube sheet 15 and the exchange tubes 14 will obtain a temperature which is somewhat higher than the temperature of the pressure shell. Therefore, the radial expansions of this tube sheet and the axial expansions of the exchange tubes will exceed the radial and axial expansions of the pressure shell 17. These differences in expansions will result in mechanical stresses concentrating at the joint between the inlet tube sheet and the pressure shell and at the joints between the exchange tubes and the inlet tube sheet. There may also be a tendency for the inlet tube sheet to bend because of axial temperature differences. Such a bending will contribute to the creation of thermal stresses in the various joints. Rupture of the joints and cracking of the exchange tubes will, therefore, often occur.

The problems, which have been described with particular reference to the inlet tube sheet, may also — although to a lesser extent — occur at the outlet tube sheet.

Figure 4:
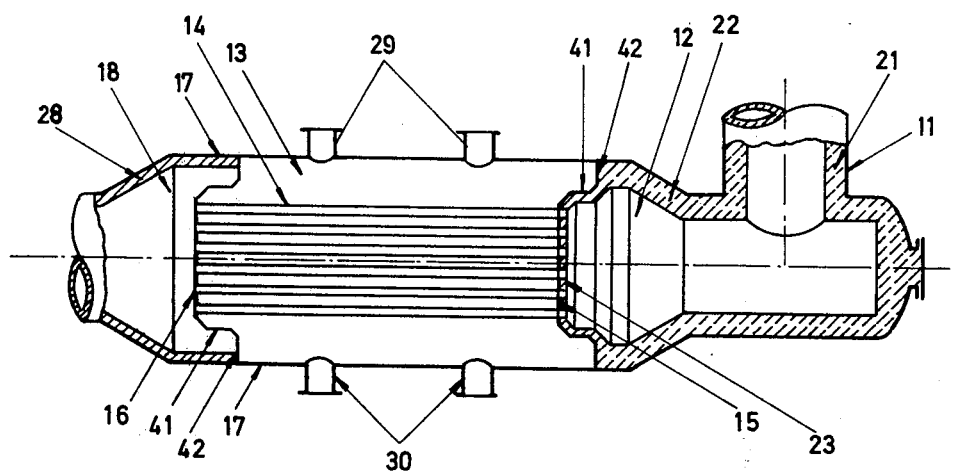
FIG. 4 is a vertical section through a heat exchange apparatus having flexible joints at both the inlet and outlet tube sheets.

In the heat exchange apparatus according to the invention the risk of such failures has been reduced or even eliminated by the use of flexible joints between the inlet tube sheet and the pressure shell, which are capable of absorbing the various expansions occurring during operation of the heat exchange apparatus and of carrying the load of the tube bundle. In more severe cases the use of such flexible joints between the outlet tube sheet and the pressure shell may also be an advantage. The use of flexible joints both at the inlet tube sheet 15 and at the outlet tube sheet 16 is illustrated in FIG. 4. Designations used in FIG. 4 have the same meaning as those used in FIG. 1.

Figure 3:
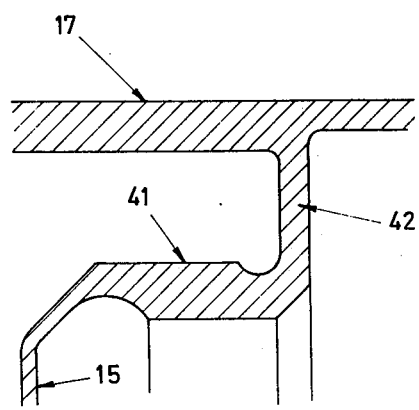
FIG. 3 is a detail of the flexible joint between the pressure shell and the tube sheet.

An example of a flexible joint, which would suitably be used in the heat exchange apparatus according to the invention, is shown in detail in FIG. 3 with particular reference to its use at the inlet tube sheet 15. It comprises a cylindrical skirt element 41 and an annular sheet 42. One end of the cylindrical skirt element 41 is connected to the inlet tube sheet 15, while the other end is connected to annular sheet 42, which again is connected to the pressure shell 17. All connections between the inlet tube sheet 15, the cylindrical shell element 41, the annular plate 42, and the pressure shell 17 can be made by welding. With such an arrangement, all expansions of the exchange tubes 14 and inlet tube sheet 15 can be absorbed by slight deformations of the cylindrical skirt element 41 and the annular sheet 42. The selection of the dimensions and construction materials for the cylindrical skirt element and the annular sheet can be made on the basis of conventional mechanical calculations.

It is particularly important that the details of the flexible joint should be designed with regard to avoiding, as far as possible, the presence of sharp notches in which damaging stresses might concentrate. However, it is known in the art how to avoid this and the design shown in FIG. 3 is only one of several possible solutions to this problem.

The heat exchange apparatus shown in FIG. 1 is only one embodiment of the invention. It has already been mentioned that the outlet tube sheet might also be connected to the pressure shell in the same way as the inlet tube sheet as shown in FIG. 4 as another embodiment. Such an embodiment would particularly be used in cases, where a primary heat exchange apparatus is followed by a secondary heat exchange apparatus operated in series therewith. In such a situation the gas stream entering the outlet channel of the primary heat exchange apparatus would still have a temperature high enough to create critical mechanical stresses, if only a simple joint between the outlet tube sheet 16 and the pressure shell 17 were used as shown in FIG. 1.

When a secondary heat exchange apparatus is used it may in practically al respects be similar to the primary heat exchange apparatus shown in FIG. 1. It is known in the art how to combine such two heat exchange apparatuses in series and how to operate them in the most efficient way. For instance, the temperature at the outlet of the secondary heat exchange apparatus will often be controlled by using an internal or external by-pass of gas.

In the heat exchange apparatus shown in FIG. 1 the inlet tube sheet 15 is displaced from the annular sheet 42 in the direction in which the gas stream is being passed. Without deviating from the scope of the invention the displacement could have been in the opposite direction. However, this would give a less efficient cooling of the exchange tubes 14 at their inlet ends. Therefore, the arrangement shown in FIG. 1 is preferable.

If a flexible joint is also used to connect the outlet tube sheet 16 to the pressure shell 17, then similar considerations would determine the direction in which the outlet tube sheet should be displaced. However, since generally the temperature at that end is lower, other considerations, such as ease of manufacture, might be decisive for the preferred design. In FIG. 4 both the inlet tube sheet 15 and the outlet tube sheet 16 are displaced from the annular sheet 42 in the direction in which the gas stream is being passed.

When the heat exchange apparatus is used as a waste heat boiler as shown in FIG. 1, it will normally be arranged with the exchange tubes in a horizontal position. For other uses, it may be more convenient to arrange the heat exchange apparatus in other positions. For instance, it would normally be arranged with vertical exchange tubes when used as a catalytic reactor for exothermic processes.

I claim:

1. An improved apparatus for indirect exchange of heat between two fluid streams, said apparatus comprising a cylindrical pressure shell enclosing a bundle of straight and parallel exchange tubes through which one of said fluid stream is circulated, an inlet tube sheet to which a first end of each exchange tube is permanently attached, and an outlet tube sheet to which a remaining end of each exchange tube is permanently attached; said inlet and outlet tube sheets defining inlet and outlet chambers at opposed ends of said pressure shell, wherein the improvement comprises a flexible joint for carrying the load of said bundle of tubes and for securing said inlet tube sheet to said pressure shell, said flexible joint comprising a flexible cylindrical skirt element having opposed first and second peripheral edges, said first edge continuously and gradually merging with said inlet tube sheet to form a continuous and integral flexible joint therebetween, said cylindrical skirt element being in spaced relationship with the inner surface of said pressure shell; and a flexible annular sheet extending between an interior surface of said pressure shell and said second edge of said skirt element furthest from said inlet tube sheet, a radially outermost periphery of said annular sheet continuously attached to said interior surface of said pressure shell, a radially innermost periphery of said annular sheet gradually merging with said skirt element second edge to form another continuous and integral flexible joint;

whereby at least one of said skirt element and said annular sheet joints flex upon thermal expansion of said exchange tubes.

2. An improved apparatus according to claim 1, wherein the improvement further comprises a second flexible joint for carrying the load of said bundle of tubes and for securing said outlet tube sheet to said pressure shell, said second flexible joint comprising another flexible cylindrical skirt element having opposed first and second peripheral edges, a first edge of said another skirt element continuously and gradually merging with said outlet tube sheet to form a third continuous and integral flexible joint therebetween, said another skirt element being in spaced relationship with the inner surface of said pressure shell; and another flexible annular sheet extending between said interior surface of said pressure shell, a radial outermost periphery of said another annular sheet continuously attached to said interior surface of said pressure shell, a radially innermost periphery of said another annular sheet continuously merging with said second end of said another skirt element to form a fourth continuous and integral flexible joint;

whereby at least one of said another skirt element and said another annular sheet joints flex upon thermal expansion of said exchange tubes.

* * * * *